Oct. 18, 1932.  N. W. BYWATER  1,883,538
STORE DOOR PICK-UP AND DELIVERY SYSTEM
Filed April 27, 1931  5 Sheets-Sheet 1
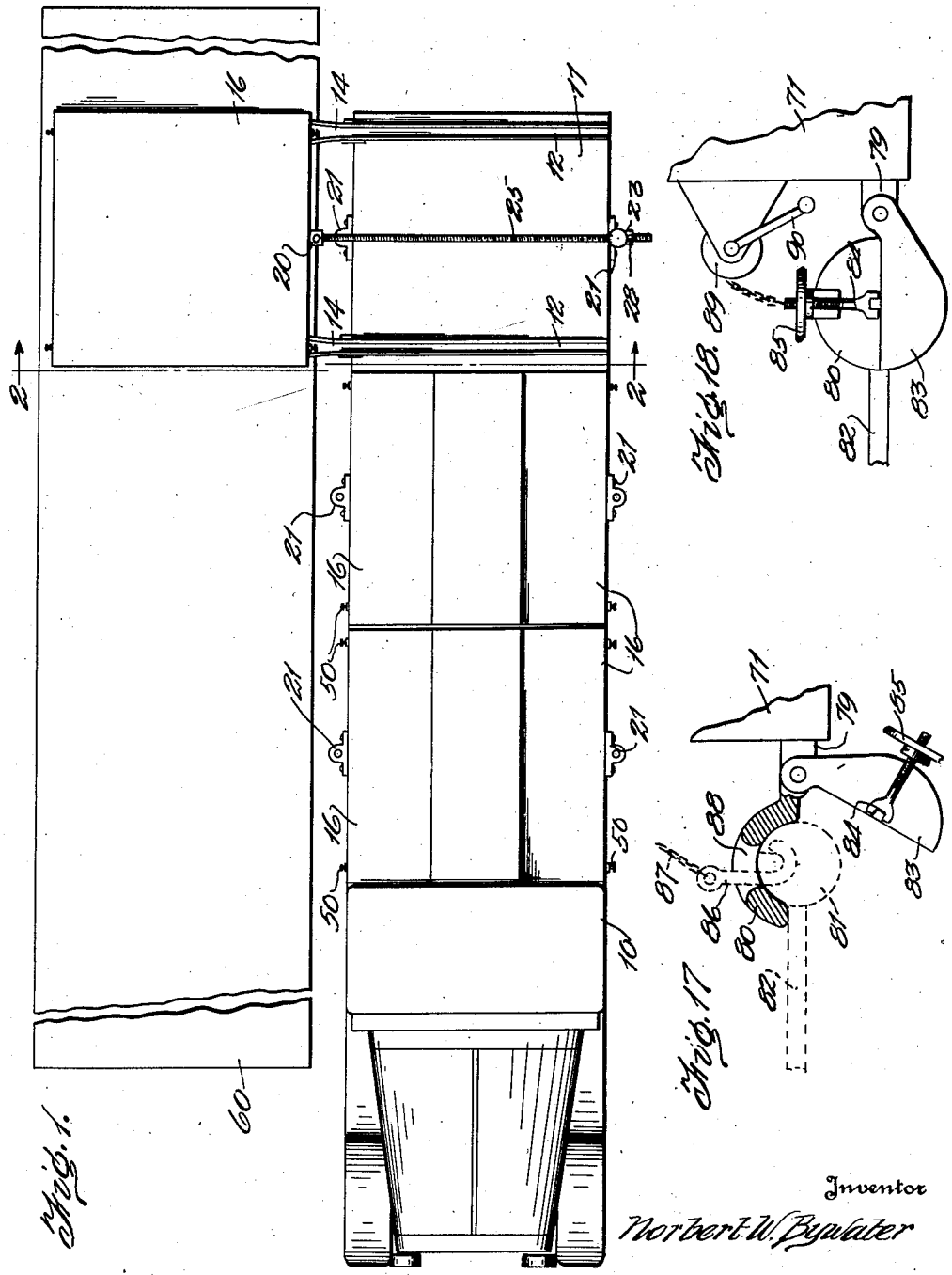
Inventor
Norbert W. Bywater
By
Attorney Oct. 18, 1932.    N. W. BYWATER    1,883,538
STORE DOOR PICK-UP AND DELIVERY SYSTEM
Filed April 27, 1931    5 Sheets-Sheet 2
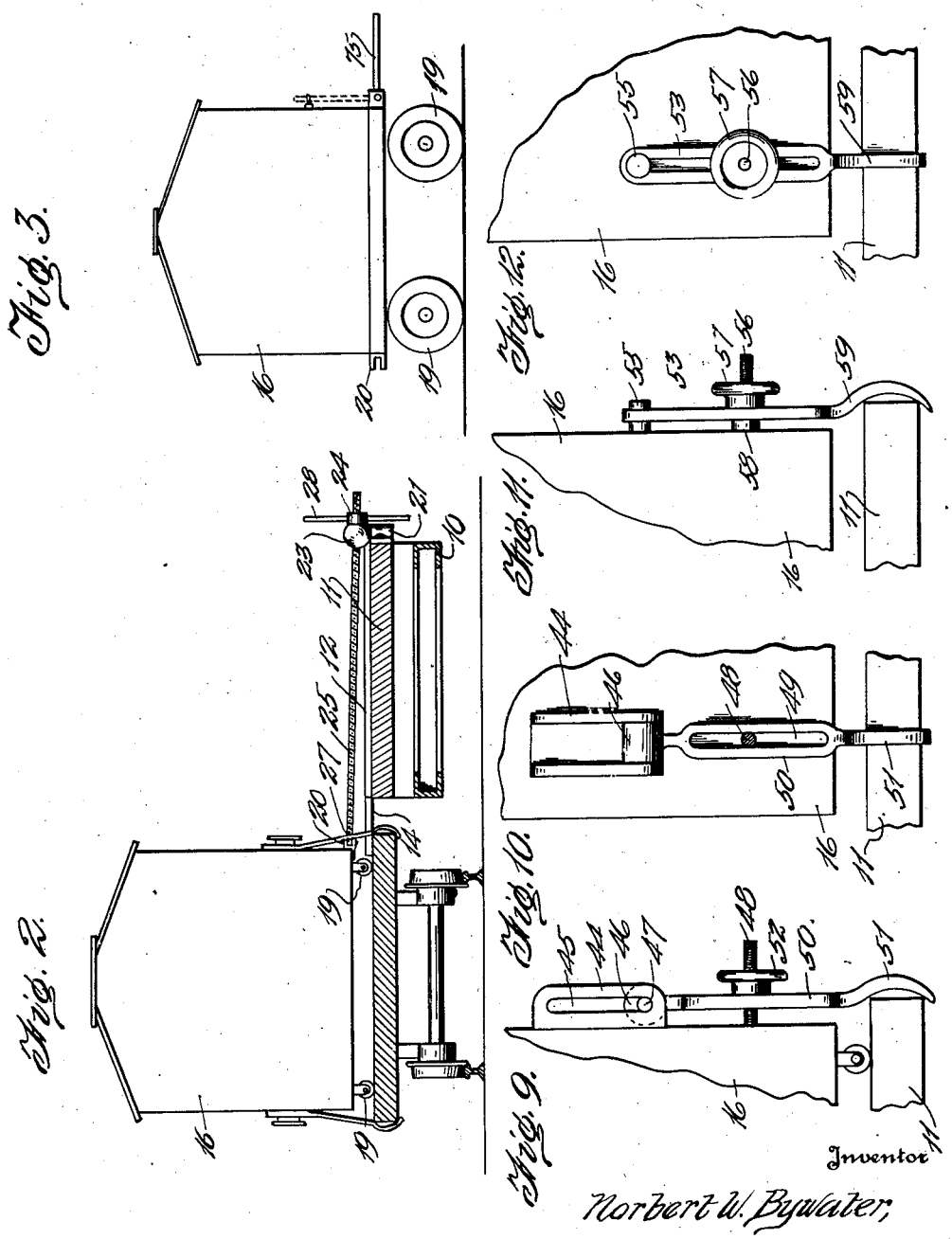
Inventor
Norbert W. Bywater,
By
Attorney

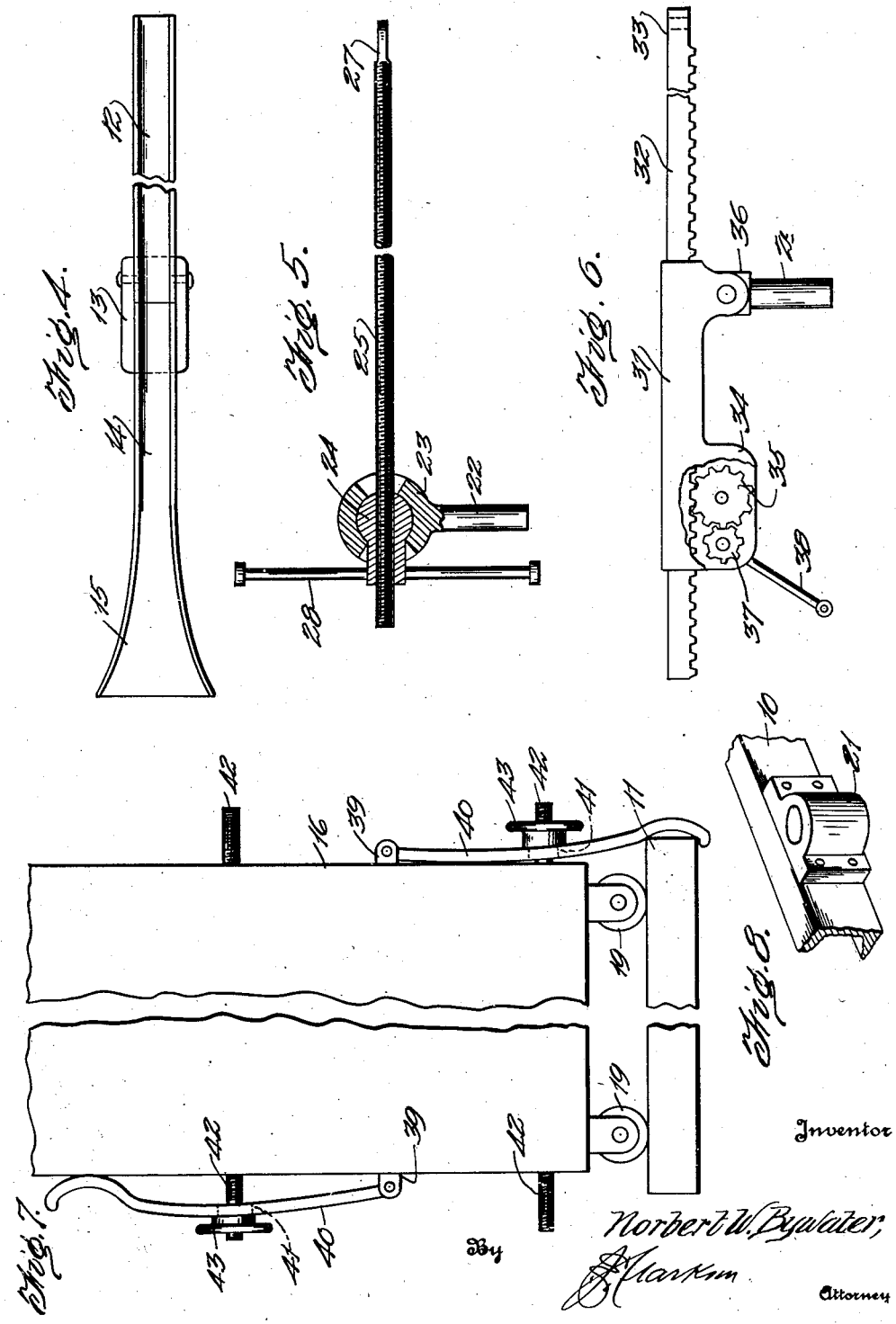

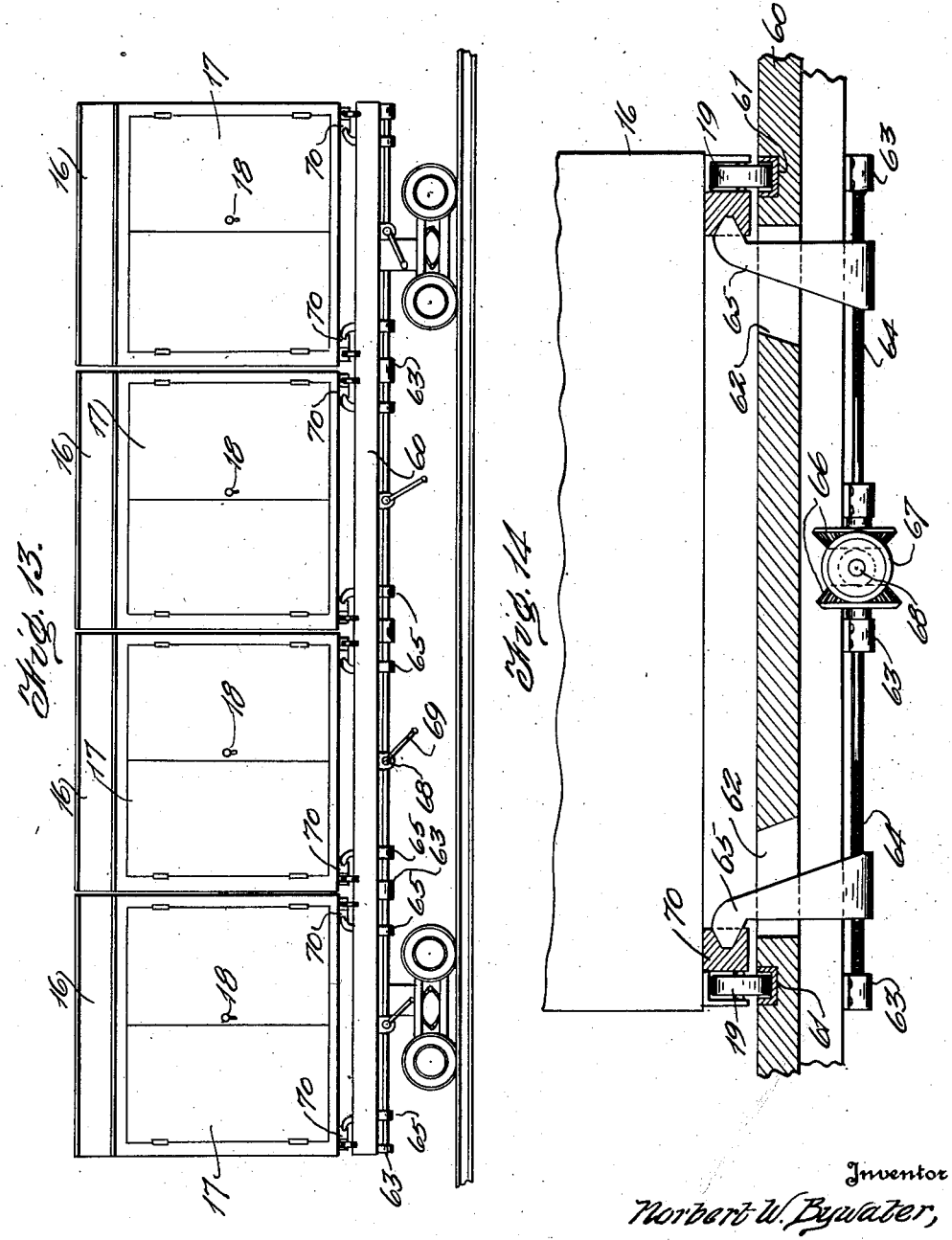

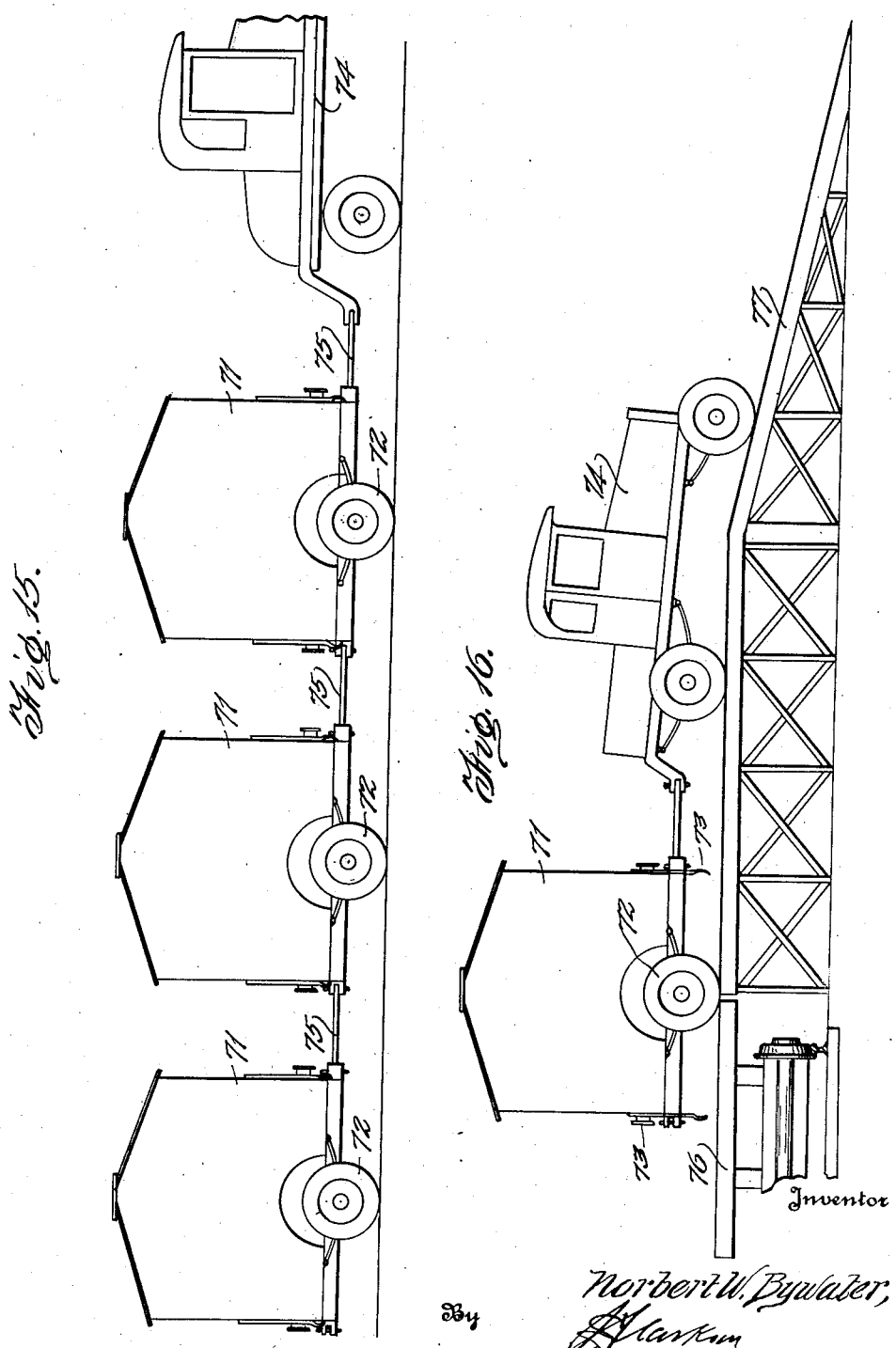

Patented Oct. 18, 1932

1,883,538

UNITED STATES PATENT OFFICE

NORBERT W. BYWATER, OF LOUISVILLE, KENTUCKY

STORE DOOR PICK UP AND DELIVERY SYSTEM

Application filed April 27, 1931. Serial No. 533,329.

This invention relates to transportation system and has special reference to freight transportation apparatus.

One important object of the invention is to provide an improved freight transportation apparatus whereby closed freight containers of convenient size may be transported from a shipping point by trucks and railroad to a distant point and then transported by trucks from the railroad directly to the store or other ultimate point of the shipment.

A second important object of the invention is to provide an improved arrangement of truck for use in a transportation system of this character.

A third important object of the invention is to provide an improved form of freight container for use in connection with such a system.

A fourth important object of the invention is to provide improved means for securing the containers on a truck or railroad car.

A fifth important object of the invention is to provide an improved means for moving the containers off of and onto the truck used herein.

A sixth important object of the invention is to provide improved means for securing the containers against movement on a freight car longitudinally thereof.

A seventh important object of the invention is to provide improved means for connecting two or more of such containers to each other and to a truck or tractor.

With the above and other objects in view as will be hereinafter apparent, the invention consists in general of certain novel details of construction and combinations of parts hereinafter fully described, illustrated in the accompanying drawings and specifically claimed.

In the accompanying drawings like characters of reference indicate like parts in the several views, and:

Figure 1 is a plan view of a truck, railroad car and containers as used in this invention.

Figure 2 is a section on the line 2—2 of Figure 1.

Figure 3 is a side elevation of one of the containers showing how the coupling bar may be folded out of the way for transportation on a vehicle.

Figure 4 is an enlarged view showing an extension track arrangement as used herewith.

Figure 5 is an enlarged detail view, partly in section showing one form of jack used herewith for moving the containers on and off the truck.

Figure 6 is a view similar to Figure 5 but showing a second form of jack.

Figure 7 is a detail view in side elevation of the lower part of a container and disclosing one form of means for securing the container from rolling out of position on the truck and railroad car.

Figure 8 is a detail perspective view of one of the sockets with which the truck is provided for the jack.

Figure 9 is a side view of a second form of container securing means.

Figure 10 is a face view thereof.

Figure 11 is a side view of a third form of container securing means.

Figure 12 is a face view thereof.

Figure 13 is a side elevation of a freight car especially equipped to carry the containers used herewith.

Figure 14 is an enlarged detail longitudinal section through such a car.

Figure 15 is a view showing the manner in which certain of the containers, in modified form, may be moved as a train.

Figure 16 is a view showing the manner of loading such a container as is shown in Figure 15 onto a car.

Figure 17 is a side elevation, partly in section of a ball joint for a coupling bar or link to be used with trailers when drawn behind a truck or tractor, the socket being open.

Figure 18 is a side elevation of such a ball joint with the socket closed.

In those parts of the invention as shown in Figures 1 to 12 inclusive, there is provided an automobile truck 10 having a flat open deck 11 whereon are arranged a series of pairs of spaced channels forming tracks 12. To one or both ends of each channel rail there is connected by a hinge 13 an extension rail 14 of channel form but provided with a laterally flaring free end 15. This extension 14 is of sufficient length to rest on the deck of a car or platform with the truck in position alongside such car or platform. In this form each container consists of a box-like body 16 provided with hinged doors 17 (see Figure 13) adapted to be locked by any suitable lock here indicated at 18. These containers each have four supporting wheels 19 arranged one adjacent each corner of the container and the supporting wheels are so spaced as to run smoothly on the tracks 11. At least one side of the container is provided with a coupler head 20 at the bottom of the container and disposed centrally of the bottom part of said side. The truck 10 is provided at its sides with sockets 21 arranged centrally between the ends of each pair of rails 12.

In Figures 1, 2 and 5 is shown one form of jack used for moving the containers on and off the truck and in this form there is provided a shank 22 adapted to fit selectively in the sockets 21. On the upper end of this shank is a ball socket 23 wherein is mounted a ball nut 24 through which extends a long jack screw 25. The screw is provided with a suitable eye 27 for connection to the coupler head of the container to be moved. A cross bar 28 is fixed to the nut 24 to rotate said nut and thereby cause movement of the screw therethrough since the latter is held from rotation by its connection to the coupler head. Thus rotation of the nut will effect movement of the container onto or off of the trucks as may be desired.

In Figure 6 there is shown a modified form of jack wherein a shank 29 is adapted to fit the sockets 21 as before. This shank carries a hinge head 30 on which is hinged a guide head 31 of rectangular tubular cross-section. Through this guide head 31 slides a rack bar 32 having a coupling eye 33 as in the former case. A downwardly extending housing 34 is arranged beneath the free or rear end of the guide head 30 and in this housing is journalled a gear 35 which meshes with the rack 32. A pinion 36 is also journalled in the housing and meshes with the gear 35. On the shaft 37 of this pinion is fixed a crank 38 by which the pinion can be rotated and the rack 32 thus be moved. It is to be noted that this rack 32 and the screw 25 form rigid jack bars which are swivelled to the sockets and may be vertically tilted. By having these rigid bars the motion of the containers is positively controlled and they cannot run away as when chains or ropes are employed.

In order to secure the container from rolling transversely of the truck or car during transportation or at other times when such movement is not desirable certain locking clamps are employed one form of which is shown in Figure 7. In this form each side of the container is provided with one or more brackets 39. Locking bars 40 are pivoted to these brackets at one end and are of such length and shape that, when in depending position as shown on the right of Figure 7, their lower ends will grip around the side edges of the deck 11. Each bar is provided intermediate its ends with an opening 41 and a pair of screws 42 project in equally spaced relation above and below the brackets 39, the screws being so positioned as to pass through the opening 41 accordingly as the bar is turned upwardly or downwardly. A hand nut 43 screws on the proper screw 42 to hold the locking clamp in inactive or in locking position as may be desired and as clearly shown in said figure. It will be observed that the members 40, when turned down as shown at the right of Fig. 7, constitute stops which serve to limit the movement of the container onto the supporting vehicle and thus prevent the jack from moving the container further than the desired positions. Thus these stops, in effect, limit the action of the jack and cooperate with the jack in properly positioning the container.

A second form of the locking clamp is shown in Figures 9 and 10. In this form each side of the container is provided with one or more vertically extending channel shaped brackets 44 having their side flanges provided with vertical slots 45. The locking clamp has a head 46 which slides in the channel of the bracket and a pin 47 passes through this head and engages in the slots 45 to hold the head in position to permit vertical and swinging movements of the clamp. A single screw 48 projects through a vertical slot 49 in the clamp body 50. The lower end 51 of the clamp is shaped to properly grip on the side of the deck 11 and on the screw is fitted a hand nut 52. By this construction the device, when not in use may be raised out of the way and may be clamped firmly against the deck edge when in use.

A third form of clamp is shown in Figures 11 and 12 in which each clamp has a body 53 provided with an elongated slot 54 wherethrough passes a stud 55 fixed to a side of the container. A screw 56 is fixed to the container below the stud 55 and also passes through the slot. A hand nut 57 is slidably and rotatably mounted in the slot and fits on the screw, the nut being provided with a collar 58 behind the body of the clamp so that rotation of the nut in one direction frees the jaw 59 of the clamp from the deck 11 and permits it to be slid up out of the way while rotation of the screw in the opposite direction effects the clamping action.

In each case these clamps grip the vehicle deck on opposite sides when in use and thereby prevent the container from rolling in either direction transversely of said deck.

In order to provide against movement longitudinally of a railroad car and also against transverse movement thereon the form of locking means shown in Figures 13 and 14 may be used. In this form there is disclosed a car having a floor or deck 60 grooved transversely to receive the channel rails 61 in which the wheels 19 of the containers 16 run. Between and adjacent the rails for each container the deck 60 is provided with a pair of slots 62. Beneath the deck below each container space are bearings 63 in which are journalled threaded shafts 64. The threaded portions of these shafts carry dogs or clamps 65 each of which projects up through a respective slot 62. On the adjacent ends of each pair of shafts 64 are bevel gears 66 which mesh with a bevel gear 67 fixed on a transverse shaft 68. The outer end of each shaft 68 is squared or otherwise formed to receive an operating crank 69 which may be moved from one to the other of the shafts 68 as needed. Extending beneath the containers 16 are cross-bars or sills 70 having suitable recesses to receive the noses of the dogs 65.

In this form of clamp, which it will be noted may also be used on a truck, the operator draws the dogs 65 toward each other by manipulation of the crank 69 in one direction to release the container and moves the dogs apart by reverse movement of the crank to lock the container in position.

In place of having a special form of truck to carry the containers, a form of the invention such as is shown in Figures 15 and 16 may be used. In this form containers 71 each mounted on wheels 72, suitable for supporting the containers while the latter are moved along streets or roads, are used. As here shown each container is mounted on but two of such wheels, the clamps 73 serving as legs or supports when the container is standing by itself. These containers may be connected together in a train and to a tractor or truck 74 by coupling bars 75. In order to load this form of container on a car 76 a simple ramp 77 is provided having at its upper end a platform 78 of the same height as the car deck, the operation of loading and unloading being clearly shown in Figure 16. Obviously, while two-wheeled containers are here shown containers may also be used in the same manner having four wheels.

A special coupling device for use with such containers is shown in Figures 17 and 18. This device comprises a draft bar 79 fixed to the container and carrying at its outer end a fixed half socket 80 for a ball end 81 on a coupling bar 82. Hinged to the bar 79 is a bottom half socket 83 on which is a swinging clamp 84 adapted, when the socket is closed, to swing over the top of the member 80 as shown in Figure 18 and there be secured by a clamping screw 85. The ball head 81 is socketed for engagement by the hook 86 of a chain 87 which passes up through an opening 88 in the member 80 to a winch 89 mounted on the container 71 and provided with an operating crank 90. This winch and chain are provided to draw the ball up solidly into its socket or cup before closing the latter, such coupling bars being too heavy for convenient manual operation.

There has thus been provided a simple and efficient device of the kind described and for the purpose specified.

It is obvious that minor changes may be made in the form and construction of the invention without departing from the material spirit thereof. It is not, therefore, desired to confine the invention to the exact form herein shown and described, but it is desired to include all such as properly come within the scope claimed.

Having thus described the invention, what is claimed as new, is:

1. A truck having a series of pairs of guide rails extending transversely thereof, a freight container for each pair of rails and having wheels supporting the container on said rails, sockets spaced along the side of the truck centrally between the rails of each pair, and a horizontal jack having a shank selectively engageable with said sockets and having a jack bar adapted for connection selectively to said containers.

2. A truck having a series of pairs of guide rails extending transversely thereof, a freight container for each pair of rails and having wheels supporting the container on said rails, sockets spaced along the side of the truck centrally between the rails of each pair, and a horizontal jack having a shank selectively engageable with said sockets and having a jack bar adapted for connection selectively to said containers, said jack bar being supported from said shank for swinging movement in a vertical plane.

3. A truck having a series of pairs of guide rails extending transversely thereof, a freight container for each pair of rails and having wheels supporting the container on said rails, sockets spaced along the side of the truck centrally between the rails of each pair, a horizontal jack having a shank selectively engageable with said sockets and having a jack bar adapted for connection selectively to said containers, and rail extensions hinged to the ends of said rails, said jack bar being of sufficient length to engage the container when rolled off said extensions.

4. A truck having a series of pairs of guide rails extending transversely thereof, a freight container for each pair of rails and having wheels supporting the container on said rails, sockets spaced along the side of the truck centrally between the rails of each pair, a horizontal jack having a shank selectively engageable with said sockets and having a jack bar adapted for connection selectively to said containers, said jack bar being supported from said shank for swinging movement in a vertical plane, and rail extensions hinged to the ends of said rails, said jack bar being of sufficient length to engage the container when rolled off said extensions.

5. A truck having a series of pairs of guide rails extending transversely thereof, a freight container for each pair of rails and having wheels supporting the container on the rails, sockets spaced along the sides of the truck centrally between the rails of each pair, a jack shank selectively engageable in said sockets, a ball socket at the upper end of said shank and having oppositely disposed openings, a ball nut in said socket and having a portion projecting through one of said openings, a threaded jack bar engaging in said nut and provided with means for selective attachment to said containers, and means to rotate said nut with respect to said jack bar.

6. A truck having a series of pairs of guide rails extending transversely thereof, a freight container for each pair of rails and having wheels supporting the container on the rails, sockets spaced along the sides of the truck centrally between the rails of each pair, a jack shank selectively engageable in said sockets, a ball socket at the upper end of said shank and having oppositely disposed openings, a ball nut in said socket and having a portion projecting through one of said openings, a threaded jack bar engaging in said nut and provided with means for selective attachment to said containers, said means being arranged to hold said bar from rotation when attached to a container, and a cross bar fixed to the projecting portion of the ball.

7. A truck having a series of pairs of guide rails extending transversely thereof, a freight container for each pair of rails and having wheels supporting the container on the rails, sockets spaced along the sides of the truck centrally between the rails of each pair, a jack shank selectively engageable in said sockets, a jack bar housing, a horizontally disposed pivot connecting said shank and housing, a jack bar movable through said housing and provided with means for attachment to a container, and means to move said jack bar through said housing.

8. A truck having a series of pairs of guide rails extending transversely thereof, a freight container for each pair of rails and having wheels supporting the container on the rails, sockets spaced along the sides of the truck centrally between the rails of each pair, a jack shank selectively engageable in said sockets, a jack bar housing, a horizontally disposed pivot connecting said shank and housing, a jack bar movable through said housing and provided with means for attachment to a container, rack teeth formed on said jack bar, gearing journalled in the housing and engaging said rack teeth, and a crank having operative connection with said gearing.

9. In a device of the kind described, a truck, a wheeled goods container mounted on the truck for movement off thereof and onto a platform, moving means carried by the truck for so moving the container, and a movable stop member carried by the container, said member being movable into and out of position to engage the edge of the platform and thereby limit the action of the moving means.

10. A truck having a series of pairs of guide rails extending transversely thereof, a freight container for each pair of rails and having wheels supporting the container of the rails, sockets spaced along the sides of the truck centrally between the rails of each pair, a jack shank selectively engageable in said sockets, a jack including a bar adapted for connection selectively to said containers, and a universal joint between said shank and jack.

11. A truck having a series of pairs of guide rails extending transversely thereof, a freight container for each pair of rails and having wheels supporting the container ot the rails, sockets spaced along the sides of the truck centrally between the rails of each pair, a jack shank selectively engageable in said sockets, a jack including a bar adapted for connection selectively to said containers, a universal joint between said shank and jack, and stops carried by the container and movable into and out of position to limit movement of the container by the jack.

In testimony whereof I affix my signature.

NORBERT W. BYWATER.